(12) United States Patent
Schnelle

(10) Patent No.: US 12,608,695 B2
(45) Date of Patent: Apr. 21, 2026

(54) CONTACTLESS PAYMENT METHOD FOR SOCIAL VENUES AND NIGHT CLUBS

(71) Applicant: Travis Paul Schnelle, Springfield, MO (US)

(72) Inventor: Travis Paul Schnelle, Springfield, MO (US)

( * ) Notice: Subject to any disclaimer, the term of this patent is extended or adjusted under 35 U.S.C. 154(b) by 112 days.

(21) Appl. No.: 18/649,160

(22) Filed: Apr. 29, 2024

(65) Prior Publication Data

US 2025/0335894 A1      Oct. 30, 2025

(51) Int. Cl.
*G06Q 20/20* (2012.01)
*G06Q 20/32* (2012.01)
*G06Q 20/34* (2012.01)

(52) U.S. Cl.
CPC ....... *G06Q 20/204* (2013.01); *G06Q 20/3278* (2013.01); *G06Q 20/352* (2013.01)

(58) Field of Classification Search
CPC . G06Q 20/204; G06Q 20/3278; G06Q 20/352

USPC .......................................................... 705/17
See application file for complete search history.

(56) References Cited

U.S. PATENT DOCUMENTS

2020/0364967 A1* 11/2020 Spice ................. G06Q 30/0282

OTHER PUBLICATIONS

Lee, Lik Hang et al. Towards Augmented Reality-driven Human-City Interaction: Current Research on Mobile Headsets and Future Challenges. ACM Computing Survey, May 2021. (Year: 2021).*

* cited by examiner

*Primary Examiner* — Fawaad Haider

(57) ABSTRACT

A method by which patrons can pay or provide gratuity payments to performers at night clubs, also known as strip clubs, and/or to wait staff at other social venues such as bars, through a contactless payment system. The use of existing nearfield or wireless technology for payment eliminates the need to use paper currency. The system is also connected to a lighting configuration for the dance floor, or service area of a bar, that alerts the performer, or bartender, when payment has been made in any of the sectors of the dance floor or serving areas.

9 Claims, 8 Drawing Sheets

CONTACTLESS PAYMENT METHOD FOR SOCIAL VENUES AND NIGHT CLUBS

FIELD OF THE INVENTION

The present invention generally relates to a contactless payment method for social venues and night clubs, or strip clubs, and more particularly to the payment of gratuity to bartenders and exotic dancers during a performance for entertainment.

BACKGROUND OF THE INVENTION

Since 2020 social distancing and use of communal locations has fallen under heavy scrutiny as viruses are easily spread through various means, including touching of objects such door handles, tables, chairs and the like. During the shutdown that occurred in 2020 privately owned businesses were closed with many unable to recover and reopen once restrictions were lifted. One particular business sector that was negatively impacted included strip clubs and social venues. The exotic dancers at these clubs earn pay mainly from the gratuity given by patrons during their performance time on stage. Since 2020 the use and handling of physical currency has decreased tremendously, for fear of the virus, directly impacting the strip club performers and wait staff. The purpose of this invention is to implement a system of contactless payment of gratuity directly to the dancers on stage and any bar type seating area at which payments are taken. This system would reinvigorate these industries as the need to carry physical paper money is no longer required to show appreciation for the performers and when purchasing refreshments or any goods associated with a typical bar.

Based on prior art search, there are no known inventions that address the situation that is presented in this disclosure.

Therefore, there is a growing demand for a method of contactless payment for exotic dancers in strip clubs, social venues, and bars eliminating the need for patrons to handle paper money.

SUMMARY OF THE INVENTION

The present invention provides a Contactless Payment Method for Social Venues and Night Clubs that uses near-field, and/or existing wireless, technology already in use in many businesses. The advantages of this type of system in an environment that is well known and associated with paper currency is that it eliminates the fear of touching paper money and sharing plastic cards that has been in circulation, whereabouts unknown.

In one embodiment of the present invention a contactless payment system is provided to accept payment by use of near-field technology. The contactless payment device uses technology that is already in use in many businesses and is attached to a section of the stage in which patrons may also place drinks or food while viewing the performance on stage. When patrons wish to pay a gratuity to the performer, payment is made using a card designated for the purpose by the establishment such as those used in gambling casinos, and/or a standard credit or debit card, and/or payment systems currently in use on smart phones and smart watches such as Apple Pay™ or Samsung Pay™ using the contactless payment device. This embodiment provides the advantage of eliminating the need to handle paper currency, thus reducing the risk spreading a virus such as COVID-19 or the common cold.

In a further embodiment of the present invention, the contactless payment system is connected to a lighting system embedded in the dance floor of the stage or tabletop of a bar area. When a patron makes a payment to a performer, or for an item from a bar, a section of the dance floor or tabletop area of a bar, associated with where the contactless payment was established, is illuminated. This embodiment provides the advantage of external motivation for the performer, or wait staff, that has been traditionally associated with paper currency thrown onto the dance floor, or bar area. The performer, or bartender, is made aware of the payment and/or of a gratuity as the section of the dance floor, or bar area, is illuminated. This embodiment provides a further advantage of adding luminescence to the ambiance of the night club or venue.

In an alternative embodiment of the present invention, the contactless payment method and lighting system could also be used at the bar station to alert the bartender that a drink order is waiting to be placed. In many social establishments and night clubs, the bar station is often the most crowded and it is often difficult to get the attention of the bartender. This method and system would be an easy and effective method to get a drink order filled with minimal wait time.

Although specific features, structures, embodiments, methods, objectives, benefits, advantages, functionality, and applications may have been disclosed, it will be understood by those having skill in the art that changes, including but not limited to, variations, modifications, combinations, alterations, omissions, and various other applications, will occur to those of ordinary skill in the art and such changes will be made without departing from the spirit and the scope of the invention as claimed. It should also be understood by anyone who reads this document that the terminology and phraseology used herein are for the purpose of description and should not be considered limiting.

BRIEF DESCRIPTION OF THE DRAWINGS

The object, features and advantages of the present invention will become more apparent by describing the preferred embodiments with reference to the accompanying figures, in which.

Corresponding reference characters indicate corresponding parts throughout the drawings. The exemplification set of characters herein is not to be construed as limiting the scope of the invention in any manner.

DETAILED DESCRIPTION OF THE INVENTION

Embodiments of the present invention will now be described in detail with reference to the accompanying drawings, in which like reference numbers designate identical or corresponding elements in each of the different views. It is to be understood that changes can be made to these embodiments without departing from the spirit or the scope of the invention. Additionally, any details set forth in this specification are not intended to be limiting and instead simply set forth some of the many possible embodiments for the invention as claimed.

1. Definitions

The following terms used throughout the disclosure are defined as follows:

Near-field, or other in use wireless technology-a short-range wireless connectivity technology that uses magnetic field induction to enable communication between devices when they are touched together or brought within a few centimeters of each other.

Figure 1:
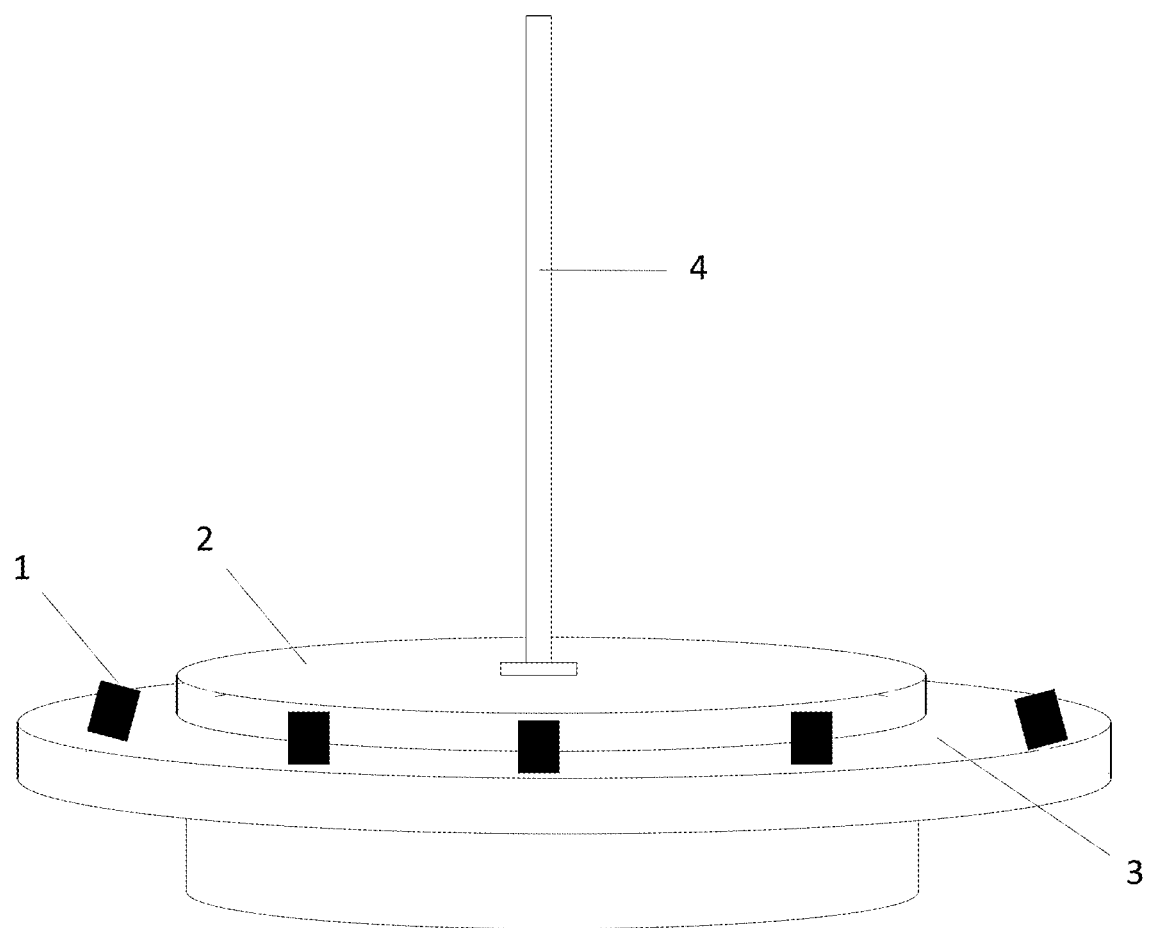
FIG. 1 illustrates an orthogonal view of a night club dance stage which includes the dance floor, patron table, and contactless payment devices around the stage in accordance with an embodiment of the present invention.

In one aspect, FIG. 1 shows an embodiment of the Contactless Payment Method with the dance floor (2), dance pole (4), patron table (3) and contactless payment device (1). The contactless payment device (1) is connected to the patron table (3) securely to ensure stable connectivity and prevent accidental dislodging of the device. The network wiring and power supply cords are managed down and under the patron table (3) to ensure the safety of the wiring and patrons. Additional wiring is made under the dance floor (2) and connected to the contactless payment device (1) which enables the illumination of the dance floor (2) when payment is made.

Figure 2:
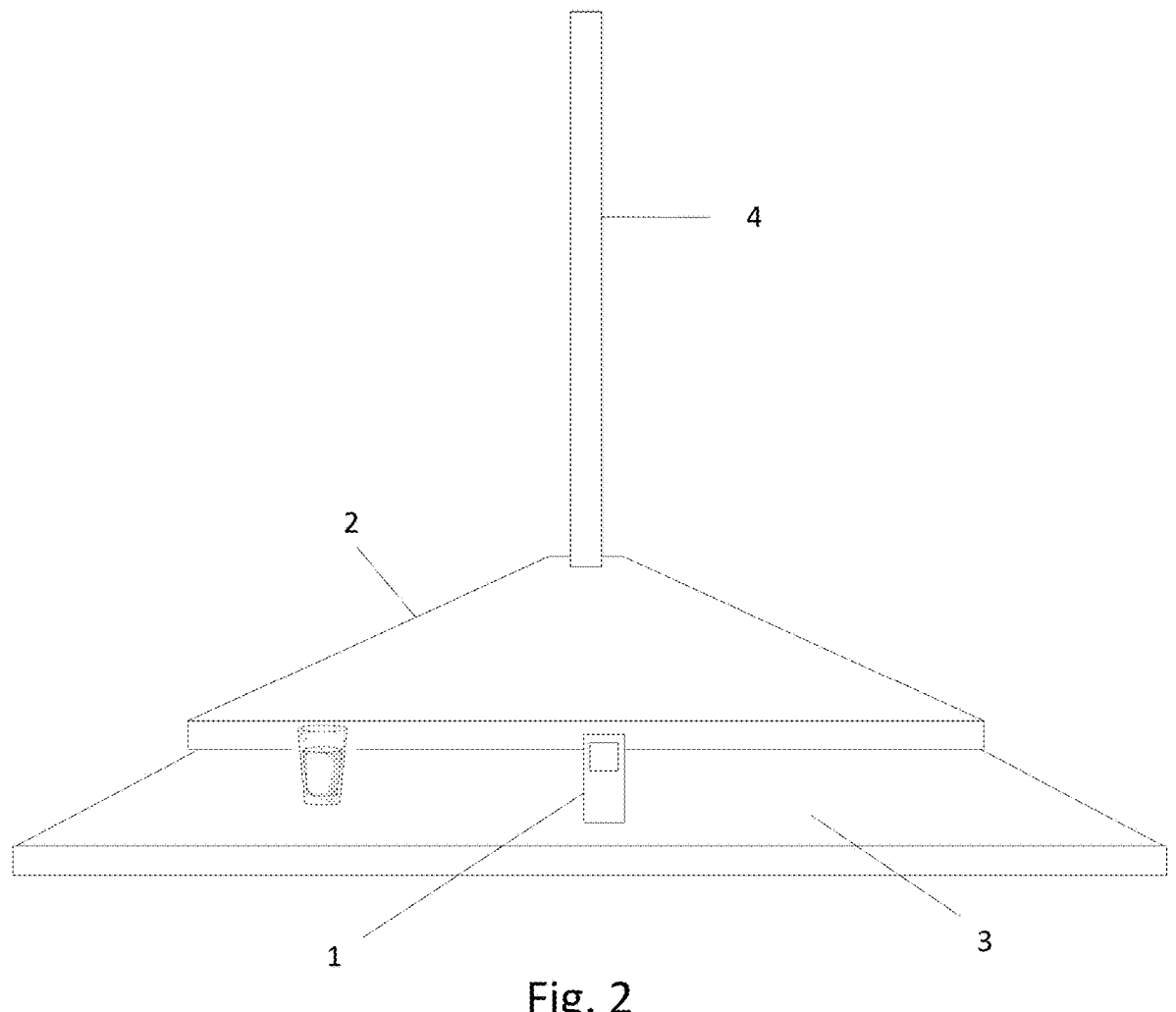
FIG. 2 illustrates a partial view of a night club dance stage which includes the dance floor, patron table, and contactless payment device to illustrate the patron table and section of the dance floor associated with the contactless payment device in accordance with an embodiment of the present invention.

Referring to FIG. 2, a partial view the dance floor (2), dance pole (4), patron table (3), and contactless payment device (1) is shown to demonstrate the location of the contactless payment device (1) on the patron table (3) and is non limiting in location.

Figure 3:
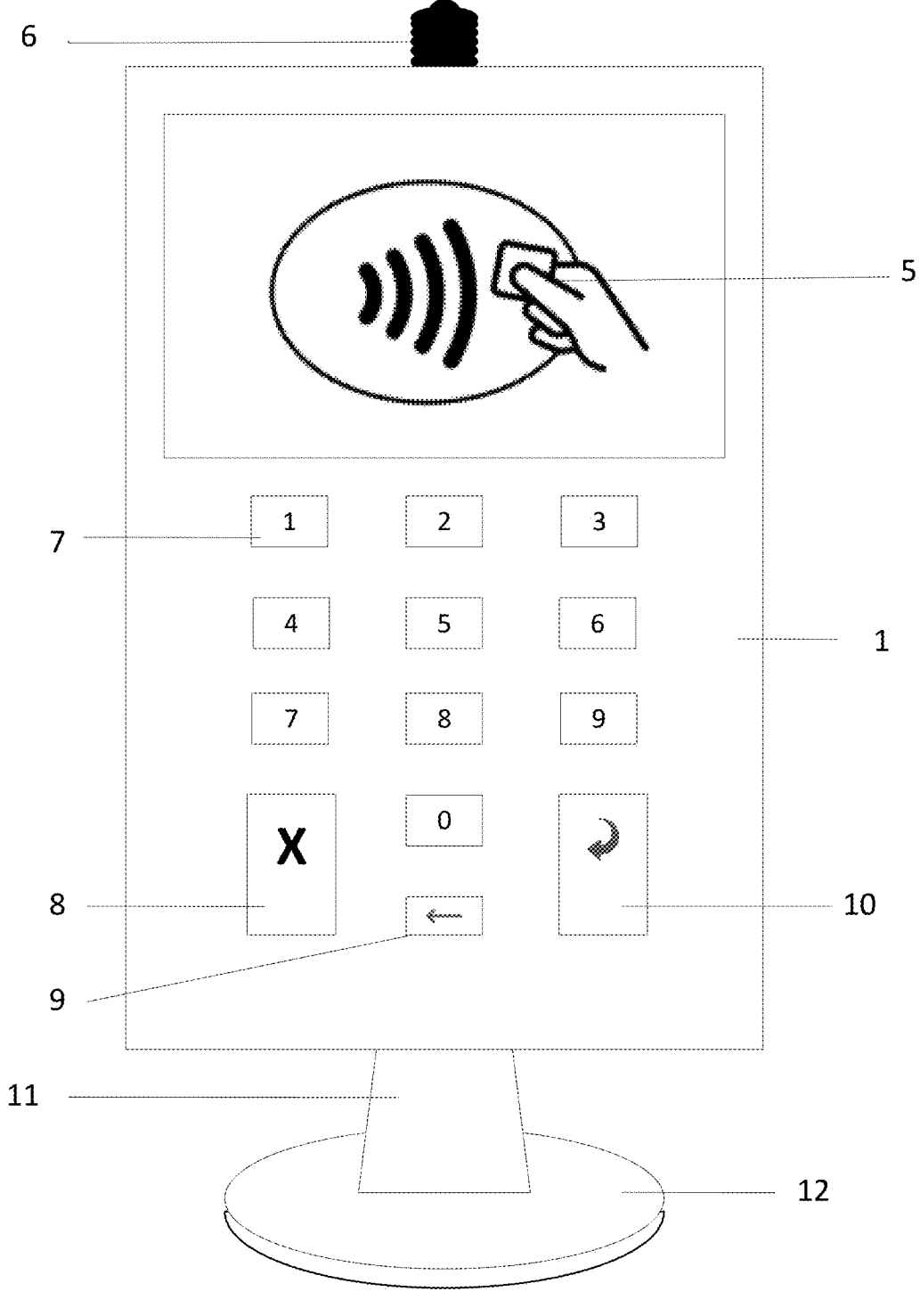
FIG. 3 illustrates an orthogonal view of the contactless payment device in accordance with an embodiment of the present invention.

Referring to FIG. 3, the contactless payment device (1) is shown in orthogonal view to demonstrate the functionality of the device and the base (12) of the device which is connected to the patron table (3). A user places a credit or debit card on or near the screen (5) using near-field technology to make payment. A numerical keypad (7) or touch screen for user input can be used if the user has a personal identification number in use with their credit or debit card. A cancel button (8) and enter button (10) are available as needed by the user. A user may go back to a previous screen using the back button (9). A stand (11) is connected to the rear side of the contactless payment device (1) and to the base (12) to keep the device off the table away from food or liquids which prevents the device from being compromised by foreign substances. The device is connected to a network or power supply by use of cables (6) which are managed under the patron table (3) and to the dance floor (2) and network mainframe.

Figure 4:
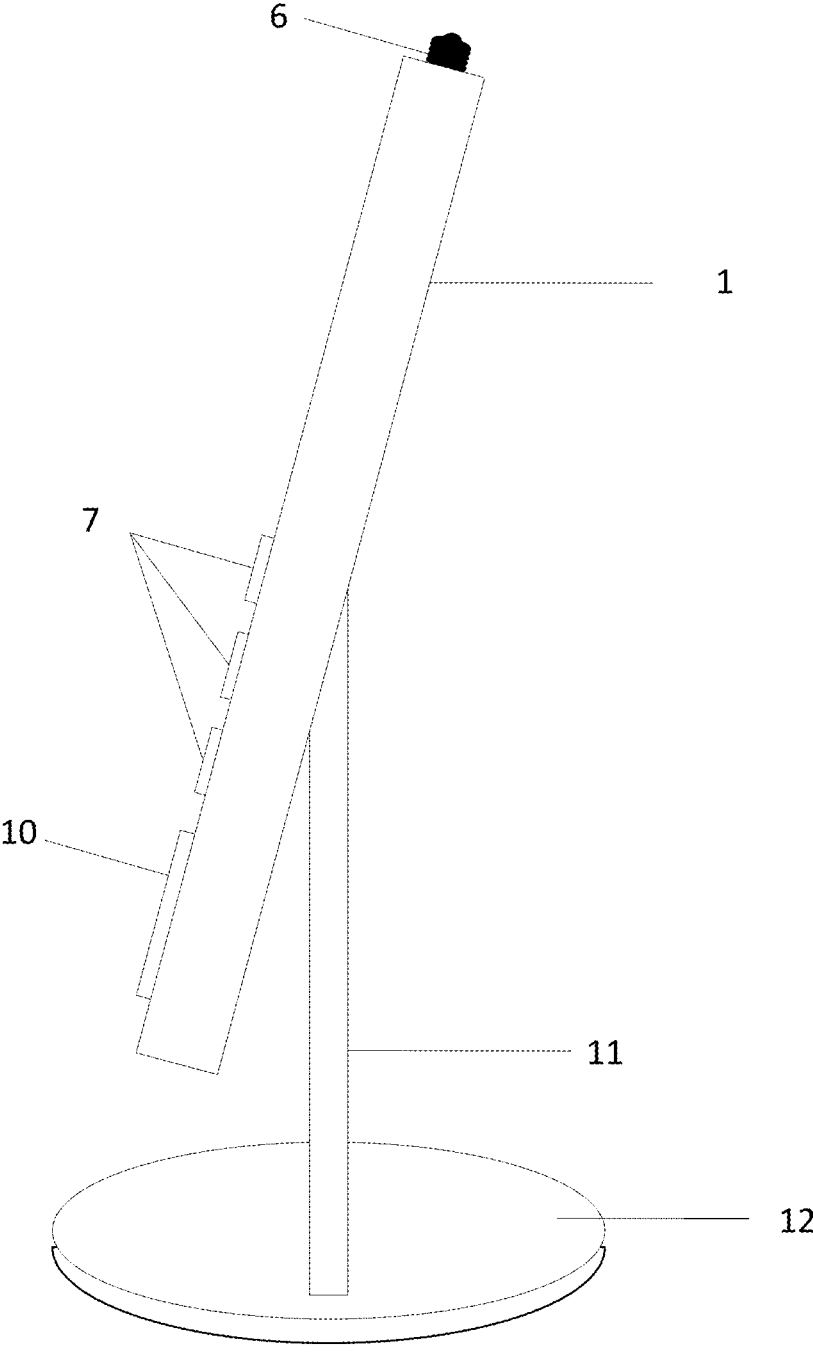
FIG. 4 illustrates a right-side orthogonal view of the contactless payment device in accordance with an embodiment of the present invention.

Referring to FIG. 4, the contactless payment device (1) is shown in right-side perspective view along with the numerical key pad (7) or touch screen, enter button (10), cables (6), stand (11) and base (12). This view demonstrates the advantage of the management of cables (6) down the rear side of the device, through the stand (11) and base (12) which keeps the cables (6) secure and free from accidental dislodging.

Figure 5:
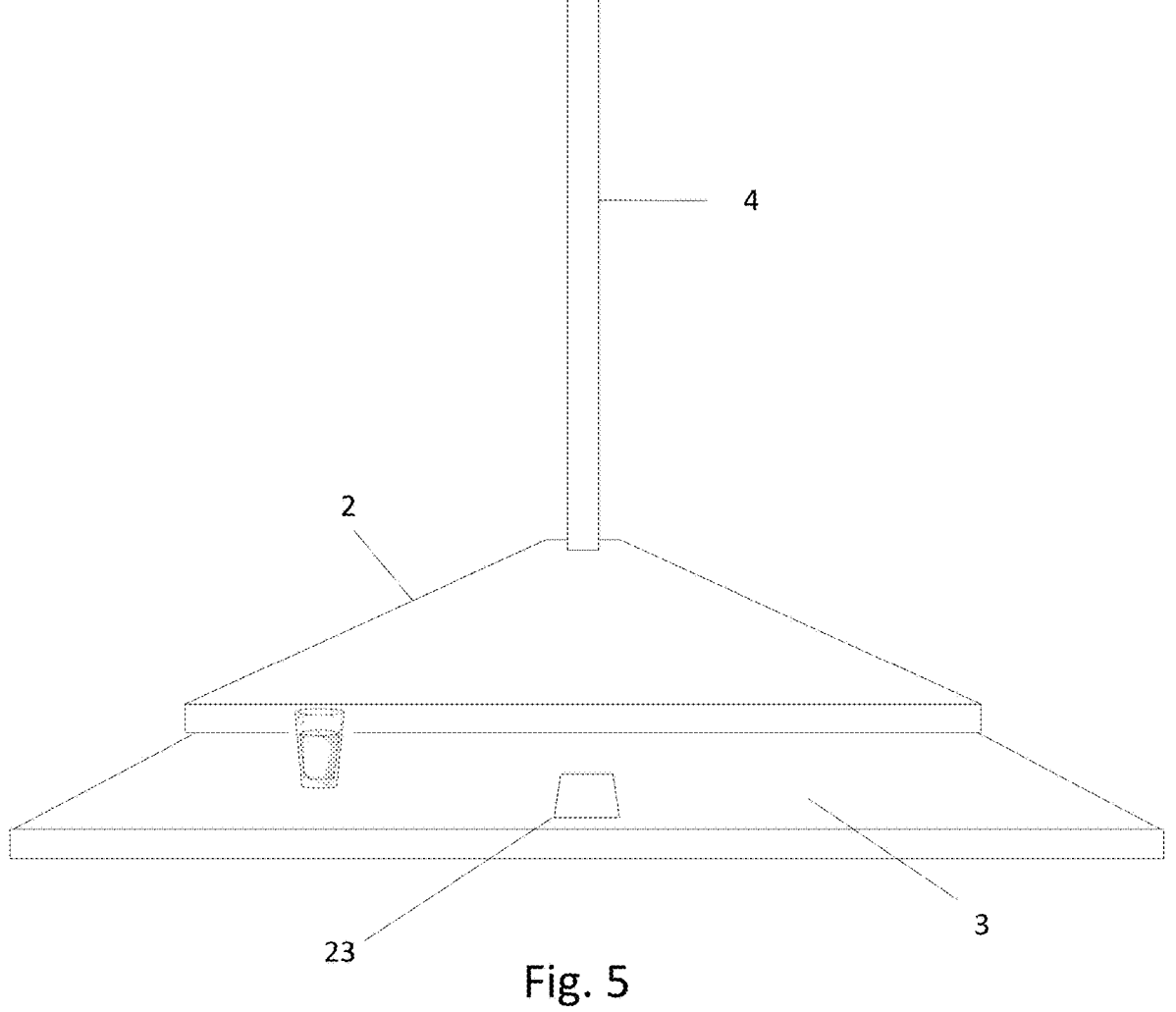
FIG. 5 illustrates a partial view of a night club dance stage which includes the dance floor, patron table, and an alternative method of placement of the contactless payment device to illustrate the patron table and section of the dance floor associated with the contactless payment device in accordance with an embodiment of the present invention.

Referring to FIG. 5, a partial view the dance floor (2), dance pole (4), patron table (3), and an alternative method of placement of the contactless payment device (23) is shown to demonstrate the location of the contactless payment device (23) embedded into the patron table (3) and is non limiting in location. This placement eliminates the potential for the device to be knocked off or damaged and further allows the contactless payment device (23) to be flush with the patron table (3) and further allows the ability to sanitize and keep clean and sterile the environment for patrons.

Figure 6:
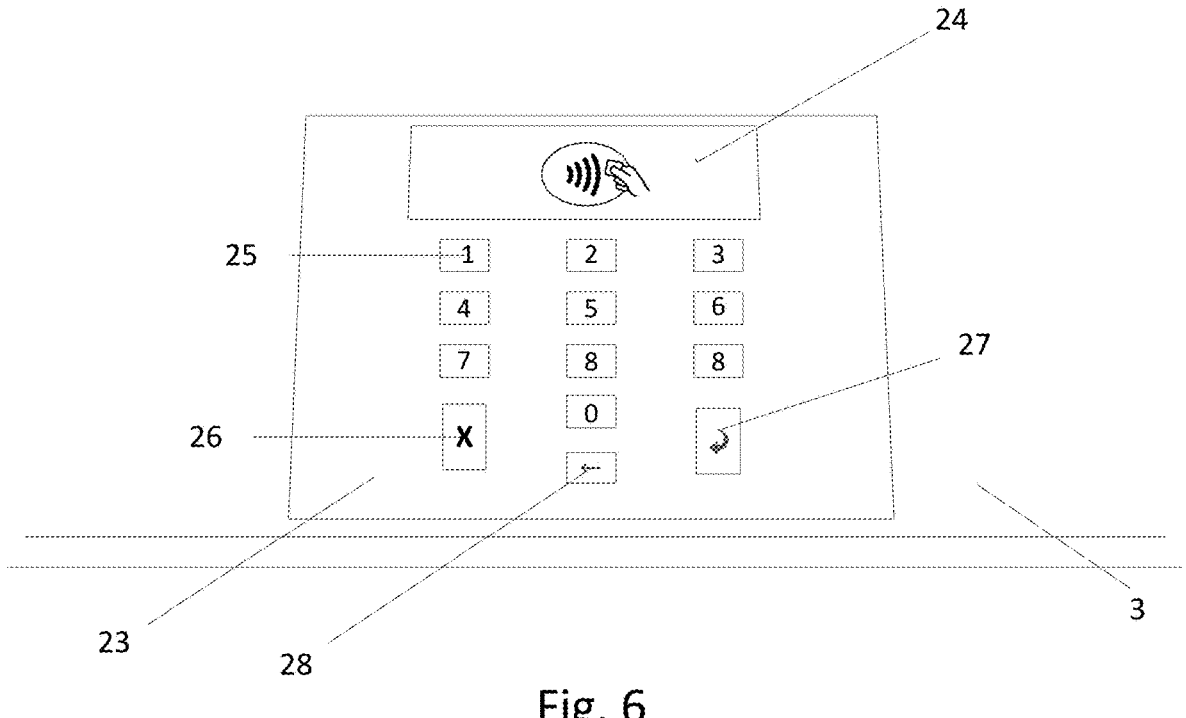
FIG. 6 illustrates an orthogonal view of an alternative method of placement of the contactless payment device in accordance with an embodiment of the present invention.

Referring to FIG. 6, the contactless payment device (23) is shown in orthogonal view to demonstrate the functionality of the device which is embedded in the patron table (3). A user places a credit or debit card on or near the screen (24) using near-field technology to make payment. A numerical keypad (25) or touch screen can be used if the user has a personal identification number in use with their credit or debit card. Cancellation of the payment may be made using the cancel button (26) or confirmed using the enter button (27). A user may go back to a previous screen using the back button (28). The device is connected to a network or power supply by use of cables which are managed under the patron table (3) and to the dance floor and network mainframe.

Figure 7:
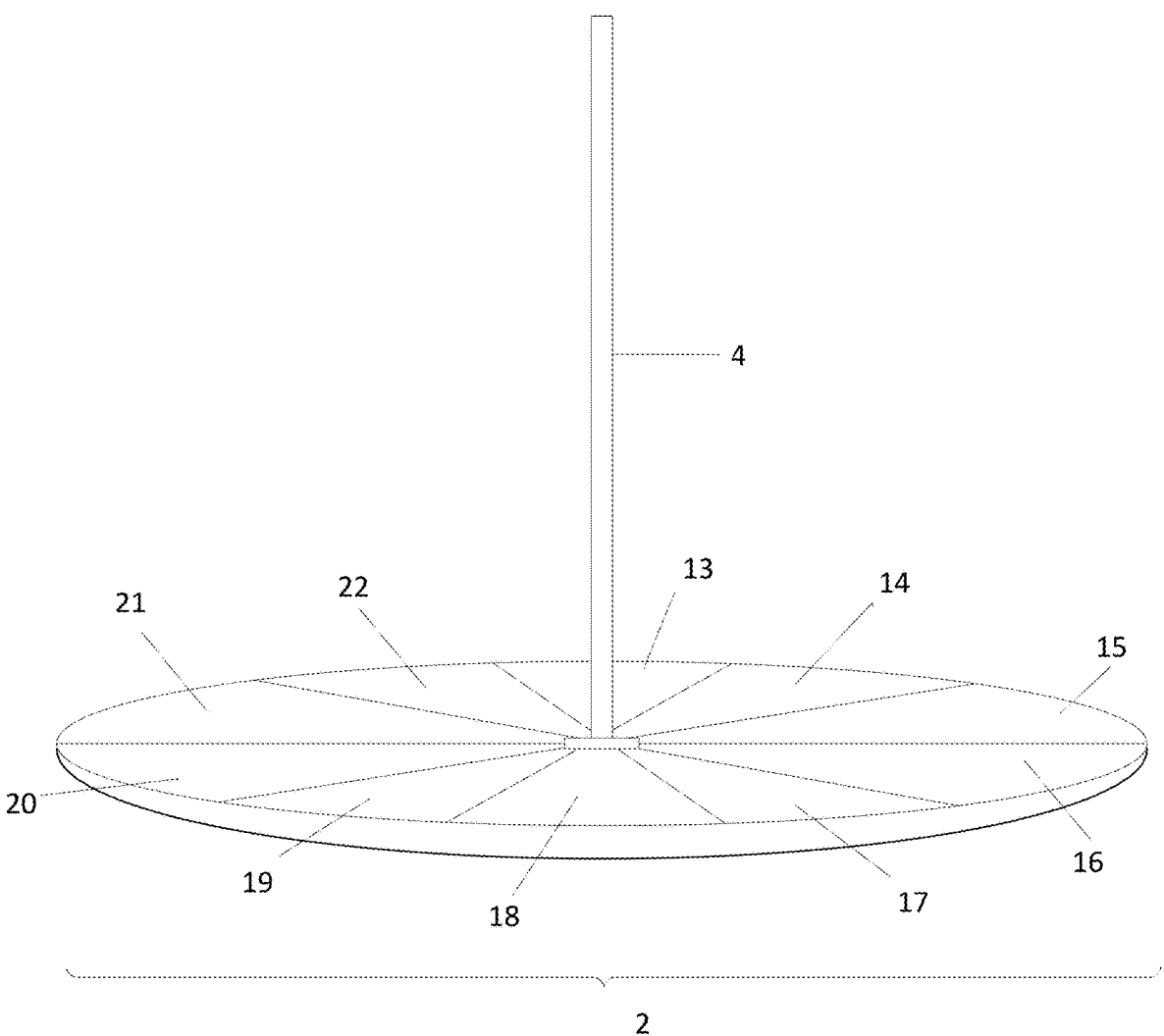
FIG. 7 illustrates an orthogonal view of the dance floor to illustrate the many sections that could be illuminated when payment is made using the contactless payment device in accordance with an embodiment of the present invention.

Referring to FIG. 7, the dance floor (2) and dance pole (4) is shown in orthogonal view to demonstrate the various sections of the dance floor (13-22) which is illuminated when payment is made using the contactless payment device (1). Each section is illuminated using a different color of light. The lighting system (13-22) is non-limiting and can be any standard lighting system in use in the industry today.

Figure 8:
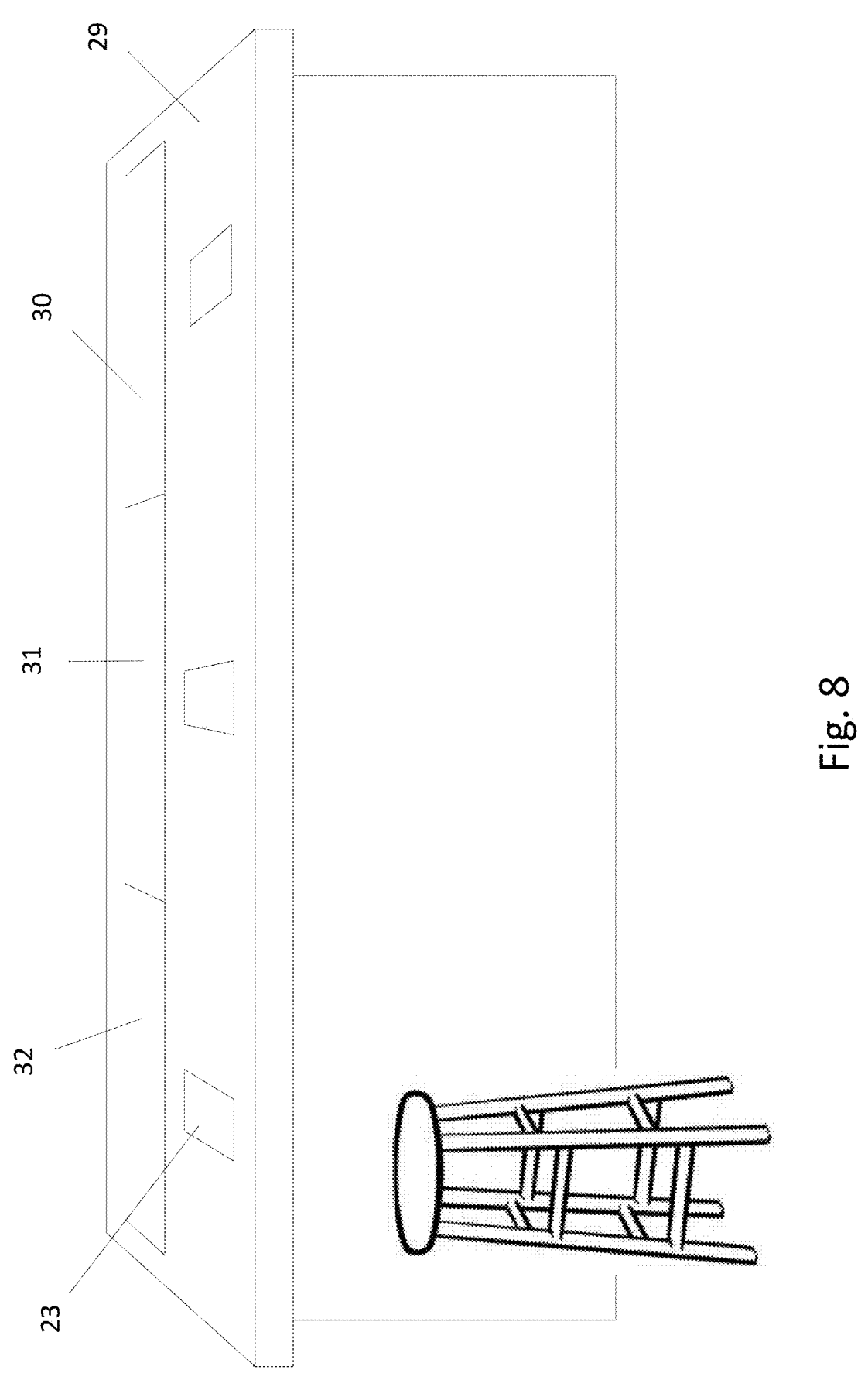
FIG. 8 illustrates an orthogonal view of a bar service area to illustrate the man sections that could be illuminated when an order is placed using the contactless payment device in accordance with an embodiment of the present invention.

Referring to FIG. 8, the service area of a bar station (29) is shown in orthogonal view to demonstrate the various sections of the bar (30-32) which is illuminated when payment or an order is placed using the contactless payment device (23). Each section is illuminated using a different color of light. The lighting system (30-32) is non-limiting and can be any standard lighting system in use in the industry today.

It will be readily apparent to anyone who reads this document that at least one embodiment of the Contactless Payment Method for Night Clubs provides the ability for payment to be made to exotic dancers without the need to use physical paper currency as well as illumination of the dance floor to serve as external motivation for the performer. Although only certain embodiments were disclosed in this document, many other variations are possible. For example, the contactless payment device and lighting system could be used at bar stands to alert a bartender that a drink order need to be filled thereby preventing long wait time for patrons wanting to purchase a drink.

Although specific features, structures, embodiments, methods, objectives, benefits, advantages, functionalities, and applications may have been disclosed, it will be understood by those having skill in the art that changes, including but not limited to, variations, modifications, combinations, alterations, omissions, and various other applications, will occur to those of ordinary skill in the art and such changes will be made without departing from the spirit and the scope of the invention as claimed. Further, it is to be understood by anyone who reads this document that the terminology and phraseology used herein are for the purpose of description and should not be considered limiting. Even further, the drawings illustrating embodiments of the present invention are used for schematic representation. The actual systems, devices, and methods of the embodiments of the present invention may depart from the foregoing schematics without departing from the spirit or the scope of the present invention.

What is claimed is:

1. A contactless payment system for night clubs and social venues such as bars, comprising:

a contactless payment device connected to a computer network, a power supply, and an electrical lighting display, the contactless payment device including a keypad configured for entering personal identification numbers and for approving or cancelling payment;

a contactless payment system wherein a lighting system comprises one or more light-emitting diodes (LEDs) configured to emit colors corresponding to payment status;

a contactless payment system and a lighting system which emits a first color when payment is initiated, a second color when payment is approved, and a third color when payment is declined;

a contactless payment system and a lighting system configured to be synchronized with venue audio and/or ambient lighting, wherein the synchronization is operative to enhance a user experience during payment confirmation;

a lighting system comprising one or more electrical light displays connected to the contactless payment device and configured to illuminate upon successful completion of a payment transaction to visually confirm payment to venue staff and patrons;

a contactless payment system wherein the contactless payment device is configured to communicate with a remote server for transaction authorization, order confirmation, and data logging;

a stand connected to a rear side of the contactless payment device, the stand comprising a rigid support column configured to hold the contactless payment device in a vertical orientation, the stand being of hollow construction to permit passage of network and power cables;

a base mechanically coupled to a lower end of the stand, the base comprising a generally planar platform configured to rest on a flat surface, the base including a central opening aligned with the hollow portion of the stand to route the network and power cables through the specified opening, and further including a plurality of screws configured to secure the base to the flat surface;

a display embedded into a countertop, tabletop, or other surface accessible to a user; and a projected-capacitive touchscreen or other user-input interface integrated with the display and configured to enable order placement and payment authorization.

2. The contactless payment system of claim 1, wherein the stand and base are fabricated from metal, aluminum alloy, or reinforced polymer to provide stability and resistance to impact.

3. The contactless payment system of claim 1, wherein the contactless payment device further comprises wireless communication capability selected from the group consisting of Wi-Fi, Bluetooth, and near-field communication (NFC).

4. The contactless payment system of claim 1, wherein the embedded display is mounted flush with a countertop or table surface to prevent spillage ingress.

5. The contactless payment system of claim 1, wherein the lighting system surrounding the embedded display is configured to pulse or change color upon successful order placement.

6. The contactless payment system of claim 1, wherein the projected-capacitive touchscreen includes an antimicrobial and/or scratch-resistant coating suitable for high-traffic environments.

7. The contactless payment system of claim 2, wherein the hollow portion of the stand includes an internal channel or conduit configured to conceal and organize the power and network cables.

8. The contactless payment system of claim 2, wherein the base further includes a removable cover plate positioned over the central opening to allow maintenance access to the cables.

9. The contactless payment system of claim 2, wherein the stand and base include a weather-resistant or moisture-resistant coating for use in indoor-outdoor venues.

* * * * *